(No Model.)

E. C. LAMBUR & G. BURDETT.
FIRE KINDLER.

No. 475,123. Patented May 17, 1892.

Witnesses.
A. Ruppert.
H. A. Daniels.

Inventors.
Edward C. Lambur
George Burdett
Per
Thomas P. Simpson
atty.

United States Patent Office.

EDWARD C. LAMBUR AND GEORGE BURDETT, OF WAUKESHA, WISCONSIN.

FIRE-KINDLER.

SPECIFICATION forming part of Letters Patent No. 475,123, dated May 17, 1892.

Application filed August 3, 1891. Serial No. 401,564. (No model.)

*To all whom it may concern:*

Be it known that we, EDWARD C. LAMBUR and GEORGE BURDETT, citizens of the United States, residing at Waukesha, in the county of Waukesha and State of Wisconsin, have invented certain new and useful Improvements in Fire-Kindlers; and we do hereby declare the following to be a full, clear, and exact description of the invention, such as will enable others skilled in the art to which it appertains to make and use the same.

The special object of the invention is to make a fire-kindler whose absorbent may be dipped in kerosene or other hydrocarbon, so as to burn with a bright flame for a considerable length of time, or as long as is at all necessary for the kindling of a fire.

Figure 1:
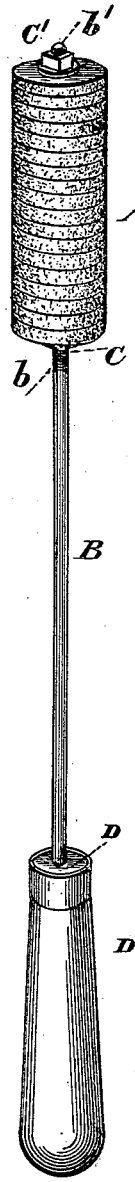
Figure 2:
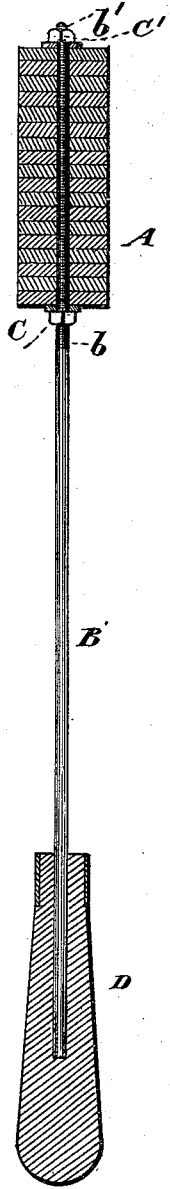

Figure 1 of the drawings is a perspective view of the kindler with the disks on the rod, and Fig. 2 a longitudinal median section thereof.

In the drawings, A represents disk absorbents, which I preferably make of asbestus; but they may be of any suitable material. These, after being dipped in oil or equivalent liquid, may be lighted with a match or otherwise and will burn with a flame until the oil has been consumed. These disks are centrally perforated and strung on a wire or rod B, which is threaded at $b$ and $b'$, where the nuts C C' are screwed up so as to clamp the disks with greater or less tightness, according to the quantity of kerosene or other oil which it is desired that they shall absorb. The nut C may be made a fixed collar and the compression effected by merely screwing up the end nut C', in which case the thread $b$ on rod is dispensed with.

D is the handle, which is made of wood or other substance which is a good non-conductor of heat, in order to protect the hand of the person who uses the kindler. Thus it will be seen that by a greater or less degree of compression the kindler may be made to burn a longer or shorter time, and also that its asbestus disks when worn out may be easily replaced at very little expense, still preserving the nuts, rod, and handle, which will last a very long time.

We are aware that perforated metallic cases have been secured by nuts on a rod and filled with absorbent for oil so as to form a kindler; but we secure the absorbent itself between nuts adjustably, so as to adapt the kindler for use with wood, soft coal, and hard coal, thus dispensing entirely with the usual kindling-wood in either case.

We are aware that a fire-kindler was patented by the United States to Jesse Newman in 1874, on the 7th of April, being numbered 149,510, and that this showed an incased absorbent secured centrally on a rod by an adjustable nut.

We are also aware that the United States subsequently granted a patent, No. 400,909, to Greene and Treman on April 9, 1889, for another incased absorbent secured centrally on an end-threaded rod with nuts; but in this latter case the same was made of a coiled spring compressible by the nut or nuts. Now we dispense with any incasement made of perforated sheet metal, as described in Patent No. 149,510, or of spiral wire, as in Patent No. 400,909, using only elastic absorbent disks on the rod, so as to make them readily compressible, easily removable, or replaceable or changeable in number, and, withal, not costing one-tenth as much to manufacture.

We are aware that United States Patent No. 400,909 describes a coiled-wire receptacle for an absorbent through which passes an end-threaded rod with nuts to compress the absorbent more or less; but this kindler must be placed inside the stove, and the wood or coal arranged upon it, while ours is simply placed under the grate, and keeps up a continuous blaze until the fuel is thoroughly kindled, when ours is simply withdrawn without fishing it from the coal or ashes, as is the case with the kindler described in the aforesaid patent. The two kindlers work differently, ours making a hot blaze, while the other produces a steady heat with but little blaze.

We are aware that a solid absorbent is described in Patent No. 149,510, granted by the United States to Jesse Newman on the 7th of April, 1874. The practical advantage of our absorbent, consisting of compressible disks, is that by tightening them to a maximum enough flame will be emitted to kindle a wood fuel; by slacking the clamp-nuts two turns enough oil is absorbed and flame emitted to light soft coal easily; also by then slacking the clamp-nuts one more turn the flame will be sufficiently strong and continuous to readily kindle hard coal.

We are also aware that an oil-fuel magazine has been described in United States Patent, No. 400,909, granted April 9, 1889, to J. D. Greene and J. C. Treman; but ours is not a magazine for burning liquid hydrocarbons as a fuel. Their magazine does not contemplate nor is it adapted to be placed under a wood or coal fire in order to kindle, while ours is not adapted to be used in a stove as an oil-magazine. Hence they are not interchangeable or each one adapted to the purpose of the other. We have no wire receptacle for the absorbent and Patent No. 400,909 describes no disks like ours. Hence

What we claim is—

A fire-kindler consisting of compressible disks of absorbent matter strung on a wire or metallic rod and provided with means of adjustment, as and for the purpose shown and described.

In testimony whereof we affix our signatures in presence of two witnesses.

EDW. C. LAMBUR,
GEORGE BURDETT.

Witnesses:
T. E. RYAN,
JOHN ROSS.